United States Patent
Guilloux et al.

(10) Patent No.: US 8,807,747 B2
(45) Date of Patent: Aug. 19, 2014

(54) SPECTACLE EYEGLASS FOR MYOPIC CHILD

(75) Inventors: Cyril Guilloux, Charenton le Pont (FR); Helene De Rossi, Charenton le Pont (FR)

(73) Assignee: Essilor International (Compagnie Generale d'Optique), Charenton le Pont (FR)

( * ) Notice: Subject to any disclaimer, the term of this patent is extended or adjusted under 35 U.S.C. 154(b) by 0 days.

(21) Appl. No.: 13/254,817

(22) PCT Filed: Mar. 5, 2009

(86) PCT No.: PCT/IB2009/052731
§ 371 (c)(1),
(2), (4) Date: Sep. 2, 2011

(87) PCT Pub. No.: WO2010/100528
PCT Pub. Date: Sep. 10, 2010

(65) Prior Publication Data
US 2011/0317128 A1   Dec. 29, 2011

(51) Int. Cl.
*G02C 3/00* (2006.01)
*G02C 7/00* (2006.01)
*G02C 7/02* (2006.01)
*G02C 7/04* (2006.01)

(52) U.S. Cl.
CPC . *G02C 7/041* (2013.01); *G02C 7/02* (2013.01)
USPC ............................... 351/159.79; 351/159.78

(58) Field of Classification Search
USPC ......... 351/246, 164, 168, 169, 171, 172, 174, 351/176, 177, 159.01, 159.05–159.21, 351/159.78, 159.79
See application file for complete search history.

(56) References Cited

U.S. PATENT DOCUMENTS

| | | | |
|---|---|---|---|
| 6,318,859 B1 | 11/2001 | Baudart et al. | |
| 6,382,789 B1 | 5/2002 | Baudart et al. | |
| 7,207,675 B1 | 4/2007 | Chauveau et al. | |
| 2011/0051079 A1* | 3/2011 | Martinez et al. | 351/160 R |

FOREIGN PATENT DOCUMENTS

| | | |
|---|---|---|
| WO | 99/66366 A1 | 12/1999 |
| WO | 2007/054762 A1 | 5/2007 |
| WO | 2008/031166 A1 | 3/2008 |

OTHER PUBLICATIONS

Schuldt, S., "Ysis—Naturliches Sehen erleben," Deutsche Optiker Zeitung, 5:38-43, May 1, 2004 (+ Google English Translation).

* cited by examiner

*Primary Examiner* — Mahidere Sahle
(74) *Attorney, Agent, or Firm* — Seed IP Law Group PLLC

(57) ABSTRACT

A spectacle eyeglass of progressive addition type has been designed for myopic children. To this purpose, an ergorama has been constructed, taking into account vision conditions encountered by the children in their everyday life. In particular, the eyeglass has a limited optical power increase between two reference eye directions ($D_1$, $D_2$), a start ($D_0$) of the optical power increase which is located quite low in the eyeglass, and an offset value (OS) for a meridian line (ML) which is higher than that of eyeglasses designed for adults.

16 Claims, 13 Drawing Sheets

OPTICAL POWER VARIATION ALONG THE MERIDIAN LINE

OPTICAL POWER

SPECTACLE EYEGLASS FOR MYOPIC CHILD

BACKGROUND

1. Technical Field

The invention relates to a spectacle eyeglass for a myopic child, also called a nearsighted child. It also relates to a process for manufacturing such eyeglass.

2. Description of the Related Art

Many children are concerned with myopia, especially in Asia countries. These children are usually equipped with unifocal negative spectacle eyeglasses, so that they can see sharply objects which are located far away from them, for example at distances longer than 2 m (meter).

But it has been observed that such unifocal myopia correcting equipment, although it compensates for the image defocus on the retina for far objects, does not prevent a long-term increase of the myopia and may even contributes to such myopia increase. Actually, it has been suspected for a long time that the fact that children accommodate a lot at near distance could be one cause responsible for myopia increase.

Then progressive addition eyeglasses suitable for myopia correction have been proposed recently. Studies have demonstrated that wearing progressive lenses during childhood significantly reduces the evolution of myopia. Such eyeglass provides myopia compensation in an upper far vision zone, and also induces reduced accommodation in a lower near vision zone. The dioptric power—also called optical power—varies continuously in a zone of the eyeglass intermediate between the far—and the near vision zones. It has a negative value in the far vision zone, and increases towards less negative values when moving from the far vision zone to the near vision zone. Then, the progressive addition eyeglass provides a good ophthalmic correction to the myopic wearer, while guarantying a reduced level of accommodation when the wearer looks at near located objects through the near vision zone of the eyeglass. In particular, a myopic child who is equipped with such progressive negative eyeglass is lead to accommodate in a smaller extent when looking at near objects, due to the optical power variation of the eyeglass. Thus, such progressive addition eyeglass is believed to reduce the long-term myopia increase for the child-wearer.

However, the inventors have observed that the existing progressive eyeglasses for myopic children were not fully satisfying. Actually, such eyeglasses are not well adapted to children because they have not been designed considering their own particular anatomy and behavior.

BRIEF SUMMARY

Then, an object of the present invention is to provide a more specific and ergonomic spectacle eyeglass intended for myopic children. More specifically, the invention aims at providing improved vision comfort for a child working at near, for example reading or writing. To achieve these objects, the invention provides a spectacle eyeglass for myopic child, of progressive addition type so as to produce variations in the optical power when the eye direction is varying through the eyeglass for a user of this latter. The eyeglass has a fitting cross intended to be located in front of an apex of the user's eye when the eyeglass is fitted into a spectacle frame and worn by the user, for the user looking ahead horizontally with his head in vertical position. This eye direction which passes through the fitting cross is called hereafter primary eye direction.

Eye directions through the eyeglass with 0.5 diopter residual astigmatism form two side limits of a channel of the eyeglass, and a meridian line is defined as the line that is equally distant from these channel limits in planes corresponding to constant declination angle. A lower part of this meridian line is offset laterally with respect to a vertical plane when the eyeglass is rotated so that upper extensions of the channel side limits extend symmetrically in lateral angular height with respect to this vertical plane, respectively towards left and right sides of the eyeglass. The optical power of the eyeglass increases along the meridian line, downwards below an upper reference eye direction which is oriented above the primary eye direction within the vertical plane. This upper reference eye direction corresponds to the point in the eyeglass where the optical power for the far vision is to be measured. For example, the upper reference eye direction may be oriented at approximately 8.5° (degree) above the primary eye direction within the vertical plane.

In addition, the following conditions are met for a spectacle eyeglass provided by the invention:

/i/ the variation in the optical power between the upper reference eye direction and a lower reference eye direction which crosses the meridian line with a declination angle value of 21° below the primary eye direction, is comprised between 1.25 and 2.75 diopters, including these limit values;

/ii/ the variation in the optical power between the upper reference eye direction and the primary eye direction is less than 0.2 diopter; and /iii/ an offset of the meridian line is higher than 5.5°, this offset being the angular distance between the vertical plane and the lower reference eye direction, measured in a plane of constant declination angle which contains the lower reference eye direction.

Therefore, a spectacle eyeglass in accordance with the present invention is suitable for myopia compensation. In addition, it is of progressive addition type, so that the values of the optical power increase along the meridian line when moving downwards with respect to the use position of the eyeglass. Thanks to this optical power addition, the eyeglass reduces or prevents the long-term increase of the myopia for the wearer. Furthermore, the eyeglass of the invention provides the following advantages, relating to the above-recited features /i/ to /iii/ respectively:

/i/ the variation in the optical power which is selected for the eyeglass, between the upper reference eye direction and lower eye directions, clamps the accommodation of the child-user's eye to an intermediate extent;

/ii/ the power increase along the meridian line, when moving from an upper zone of the eyeglass which contains the upper reference eye direction towards a lower zone which contains the lower reference eye direction, starts substantially at the fitting cross. This start position for the optical power increase along the meridian line is quite low in the eyeglass, thereby providing a large upper vision zone. Thus, the wearer has a large far vision field, which is nice and comfortable for many actual vision conditions. In particular, such large far vision field is very useful for a child-wearer, for example during outside games, sports, video watching, etc. At the same time, such position for the start of the optical power increase along the meridian line is not too low in the eyeglass so as to prevent that a child-user gazes at near objects through the far- or intermediate vision zone of the eyeglass. In addition, the resulting variations in the optical power along the meridian line are well-adapted to the head and eye vertical movements that are executed by children;

/iii/ the offset value is high and thus especially well-adapted for a child-user of the eyeglass. Indeed, because of his short height, a child looks at near objects such as a book for reading, with a vision distance that is shorter than that for an adult. The near vision distance for an adult is commonly about 40 cm (centimeter), whereas the inventors have observed a near vision distance of about 25 cm only for a child. This difference in the near vision distance between an adult and a child is particularly true for sitting reading a book lain on a table.

Because of these reasons, spectacle eyeglasses in accordance with the invention are particularly adapted for myopic children. They provide them with improved vision comfort, in particular because of the appropriate optical power variation between the far- and near vision zones of the eyeglass, and because of the appropriate offset value.

The residual astigmatism is the difference between the astigmatism that is prescribed to the wearer and the astigmatism generated by the lens. The residual astigmatism is also known as the unwanted astigmatism by the Man skilled in the ophthalmic field. Practically, the unwanted or residual astigmatism is zero for the upper reference eye direction. Its values are also very low all along the meridian line. In various embodiments of the invention, the following further features may be advantageously met, separately or in combination with one another:

the variation in the optical power between the upper- and lower reference eye directions may be comprised between 1.75 and 2.25 diopters, including these limit values;

the variation in the optical power between the upper reference eye direction and the primary eye direction may be less than 0.1 diopter;

the offset of the meridian line may be higher than 6°;

the maximum of residual astigmatism along the meridian line between the upper reference eye direction and an eye direction for which the variation in the optical power with respect to the upper reference eye direction is maximum, is less than 0.3 diopter, and preferably less than 0.2 diopter;

the variation in the optical power between the upper reference eye direction and an eye direction which crosses the meridian line with an declination angle value of 29° below the primary eye direction, may be comprised between 2.2 and 2.4 diopters;

the maximum variation in the optical power along the meridian line between two eye directions with respective declination angle values which are comprised between 30° and 45° below the primary eye direction may be less than 0.2 diopter. More preferably, this maximum variation may be comprised between 0.15+/−0.05 diopter;

the maximum variation in the optical power along the meridian line within an eye direction range of 40° from the primary gaze direction, with respect to the upper reference eye direction, is comprised between 1.5 and 2.75 diopters, preferably between 2.0 and 2.5 diopters;

a ratio between a maximum optical power gradient along the meridian line and a reference slope is comprised between 0.05 and 0.09, preferably between 0.06 and 0.08, with the reference slope being calculated for the optical power variation of the eyeglass between the upper- and lower reference eye directions; and an angular width between the channel side limits may be higher than 50°, preferably higher than 60°, in a plane of constant declination angle with 8.5° tilt above the primary eye direction.

In particular, the provision of a segment of the meridian line within the near vision zone of the eyeglass, in which the optical power is nearly constant, ensures that behavior dispersion from one kid to another one is taken into account. This applies specifically for children, since they may gaze at books lain on a table just in front of them with eye directions oriented downwards and variable in a wider extent, including eye directions through the very bottom part of the eyeglass.

A spectacle eyeglass according to the invention may comprise at least one complex surface. Within the frame of the present specification, a complex surface is continuous and has curvature values which vary between points of this surface that are apart from one another.

The invention also provides a process for manufacturing a spectacle eyeglass as described above, intended to a myopic child. Such process comprises the following steps:

/1/ obtaining a myopia prescription for the child;

/2/ selecting a progressive addition blank suitable for obtaining the spectacle eyeglass; and /3/ modifying the progressive addition blank so as to obtain the spectacle eyeglass with optical values corresponding to the myopia prescription for at least one eye direction through the eyeglass.

Step /3/ may comprise a machining of the progressive addition blank. In addition, the progressive addition blank may be modified in this latter step so that the optical values of the eyeglass which correspond to the myopia prescription are produced for the upper reference eye direction.

BRIEF DESCRIPTION OF THE SEVERAL VIEWS OF THE DRAWINGS

These and other features and advantages of the invention will become apparent from the detailed specification below, which is provided only for illustration purpose without inducing any limitation, based on the appended drawings now listed:

FIGS. 2b and 2c are respectively an optical power map and a residual astigmatism map for the first eyeglass of FIG. 2a;

DETAILED DESCRIPTION

Figure 1A:
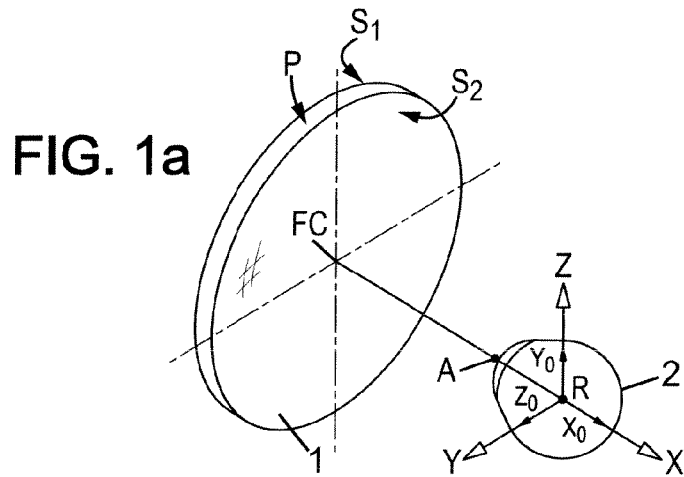
FIGS. 1a-1c represent a spectacle eyeglass in use position in front of a user's eye, with axes appropriate for identifying eye directions.
Figure 1B:
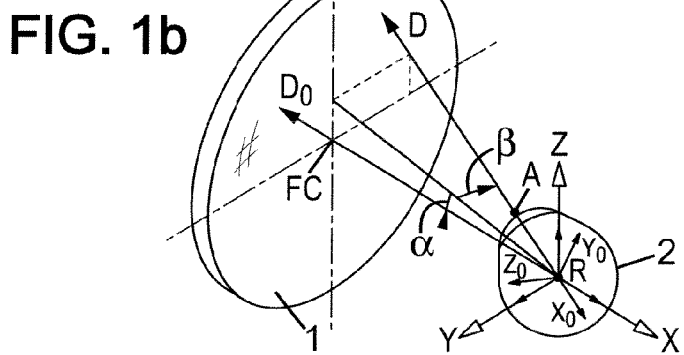
Figure 1C:
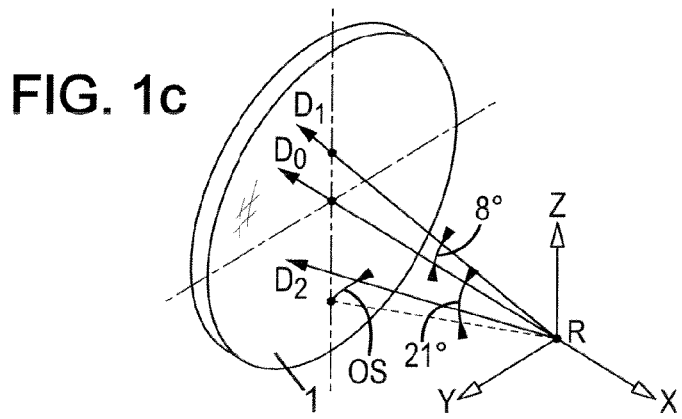

Reference number 1 in FIGS. 1a-1c generally denotes a spectacle eyeglass according to the invention. This eyeglass has a convex front surface Si and a concave back surface $S_2$. Actually, the invention also applies to an eyeglass blank, which is provided with only one final surface Si or $S_2$, for example the front surface Si. Preferably, this final surface is a complex surface, which provides the features and advantages of the invention to the final eyeglass that is supplied to the user. Therefore, the eyeglass blank is of progressive addition type. In such case, the other surface is to be machined so as to obtain an ametropia compensation which corresponds to an ophthalmic prescription determined for the user. Then, this other surface may have constant curvature values, so that it is sphero-toric. The optical data which are reported below then refer to the final eyeglass obtained from the eyeglass blank. The eyeglass 1 is intended to be fitted into a spectacle frame, so that the user—also called wearer—of the spectacles can wear it normally. To this purpose, the eyeglass 1 is intended to be trimmed off at his peripheral edge in accordance to dimensions of the spectacle frame. Because these dimensions depend on the spectacle frame design, the eyeglass 1 is initially large enough, with a disk shape of 60 mm (millimeter) in diameter for example.

In a manner which is commonly used in the ophthalmic field, the eyeglass 1 is provided with coordinates of a fitting cross. These coordinates are either provided in a manufacturer specification, or the fitting cross is directly printed on the eyeglass, so that it can be seen permanently or temporarily. The fitting cross is located on the front surface Si and denoted by FC. The eyeglass 1 is to be fitted into the spectacle frame so that the fitting cross FC is situated in front of the eye apex A of the spectacle wearer when he looks ahead horizontally, with his head in the vertical position. Then, the fitting cross FC is located at the intersection between a primary gaze direction and the front surface of the eyeglass.

FIG. 1a represents the optical system of the eyeglass 1 together with the user's eye 2 when the user is looking along the primary gaze direction. In this position, the fitting cross FC is in line with both the eye apex A and a rotation center of the eye 2, which is denoted by the letter R. The Man skilled in the art will understand that the alignment of FC, A and R may be geometric, without considering any refractive effect, or optic using light ray tracing for aligning an image of FC with both A and R. Three axes X, Y and Z originating from R form a first right-angled system defined by the positions of the eyeglass 1 and the user's eye 2. X-axis is horizontal, and is passing through the fitting cross FC or the image thereof, A and R. Then, X- and Z-axis define a vertical plane, and X- and Y-axis define a horizontal plane. A second right-angled system is associated with the user's eye 2 and rotates with it. It comprises the axes denoted by $X_0$, $Y_0$ and $Z_0$ (FIG. 1b). These axes also originate from R and are respectively superposed to the axes X, Y and Z when the user's head is vertical and the user is looking along the primary eye direction (FIG. 1a). $X_0$-axis is the optical axis of the eye 2, so that it passes through the apex A and always corresponds to the eye direction of the user. In the present specification, the phrase eye direction indicates any direction across the eyeglass 1 which passes through the rotation center R and points ahead of the eyeglass. Such eye direction corresponds to $X_0$-axis for the appropriate rotation of the eye 2. Then each eye direction D is defined with two angles relative to the X-, Y- and Z-system. The first angle is denoted by α and is called declination angle. It is measured in the vertical plane (X, Z) between a reference direction Do which superposed to X-axis but oriented oppositely, and a perpendicular projection of the eye direction D on the plane (X, Z). The direction $D_0$ is called primary eye direction, and oriented ahead the eyeglass 1. The declination angle α is positive towards the bottom part of the eyeglass 1 as oriented when fitted in the spectacle frame. The second angle is denoted β and is called azimuth angle. It is measured between the projection of eye direction D in the vertical plane (X, Z) and the eye direction D itself It is oriented positively towards the user's nose.

FIG. 1c defines two eye directions which are fixed with respect to the eyeglass 1. These directions are respectively called upper reference eye direction and lower reference eye direction. The upper reference eye direction is denoted Di and passes through the point of the eyeglass where the far vision parameters are to be measured. This point is indicated by the manufacturer of the eyeglass and may have a declination angle value of approximately −8.5°. The lower reference eye direction is denoted $D_2$ with a fixed declination angle of +21°. Because of the positive orientation downwards for the declination angle α, Di and $D_2$ are oriented above and below the primary eye direction $D_0$, respectively. The direction $D_1$ is comprised in the vertical plane (X, Z), with zero β-value, whereas the direction $D_2$ is offset horizontally with respect to the plane (X, Y) towards the wearer's nose. In addition, as the eyeglass is of progressive addition type, optical power values and astigmatism values produced by the eyeglass 1 vary when the eye direction D changes through the eyeglass. The method for designing such progressive addition eyeglass intended for a myopic child is now described. First, an ergorama has been determined taking into account the vision conditions encountered by a child in his everyday life. Indeed, the inventors have observed that children have activities which are different from those of the adults on one hand, and also have different geometrical constraints due to their short height on the other hand. The ergorama is a function which associates vision distance values with eye directions through the eyeglass. When making such association, one has to take into account the vertical position which is adopted by a child for his head, as well as the vision distance for each eye direction.

In particular, children look at far objects very often during their activities, for example when playing outside with other children, or doing sport, running, and even when they are looking at the blackboard in school classrooms. During these activities, they need to see sharply at far distance within a large vision field, in particular along the horizontal transverse direction.

In addition, due to their short height, children often adopt positions when sitting reading or working at a table, in which their eyes are only at about 25 cm (centimeter) from the book. So this value has been adopted for defining the vision distance which corresponds to the lower reference eye direction necessary for the ergorama in the bottom part of the eyeglass.

Also, when they look at a book from top to bottom of the pages, they change their eye direction over a large range. Indeed, they may lean their head forward so that their gaze direction may become vertical, downwards to the bottom of the book. Then, starting from this head position, they may look higher in the page. Such gazing conditions are special for children, and are taken into account for constructing the ergorama by considering that children rotate vertically their eye direction and their head at a same time, according to a vertical coordination factor of about 0.7. When varying the gaze direction within a vertical plane, the angle value of the gaze direction variation is the sum of an angle value for the variation in the head orientation, with the variation of declination angle α for the eye direction as introduced earlier. The vertical coordination factor is then the ratio of the angle value for the vertical variation in the head orientation by the angle value for the gaze direction variation. These gazing conditions special for children require that the eyeglass has a quite steep power variation and a lower vision zone in which the optical power is almost constant and suitable for 25 cm vision distance. In the present specification, the power variation is characterized by the slope of the optical power along the meridian line ML from the upper reference eye direction $D_1$ down to the eye direction where the optical power increase is maximum. This latter eye direction, where the optical power increase is maximum, is denoted $D_3$ in the map figures.

Two more features special for the children have been identified by the inventors. Due to the near vision distance which is shorter for children than for adults, the lateral offset of the eye direction towards the user's nose is higher for the children, for near vision condition with respect to far vision conditions.

This lateral offset has been determined to be preferably higher than 5.5°, preferably higher than 6°, whereas it is commonly less than 4.5° for a myopic adult.

Finally, because the children have an important capability to accommodate, it is better to clamp their accommodation to an intermediate value when they gaze at near objects. For example, the variation in the optical power between the upper reference eye direction $D_1$ and the lower reference eye direction $D_2$ may clamp the child's accommodation to about half of his maximum accommodation needed at $D_2$, which is about 4.0 to 4.25 diopters. So, the power variation of the eyeglass is preferably limited to the range 1.25 to 2.75 diopters, preferably from 1.75 to 2.25 diopters.

Based on these features special for children, the ergorama is constructed. Others features necessary for this construction which have not been reported above are set in a usual manner, similar to that for an eyeglass which is designed for an adult user.

Then the eyeglass is computed so as to meet children needs and behavior for each eye direction. The computation may be performed using a program commonly used in the ophthalmic field, for example by implementing an optimization program. The computation result is the optical design of the eyeglass. Parameter values used for this computation which are not recited here are set in a usual manner. In particular, the following values have been used: pantoscopic tilt: 6°, distance between the eyeglass back surface $S_2$ and the eye rotation center R: 25.5 mm, and half of the pupillary distance: 29 mm.

The final eyeglass is manufactured, for example by machining the back surface $S_2$ in accordance with a spherical or toric shape. This spherical or toric shape may be selected so as to produce, for the reference direction Di, the optical power and the astigmatism values that have been prescribed for the eyeglass user.

Table 1 below indicates optical reference values in diopters for four eyeglasses obtained as described above. It also indicates the appended Figures which correspond to each eyeglass.

TABLE 1

Figure 2A:
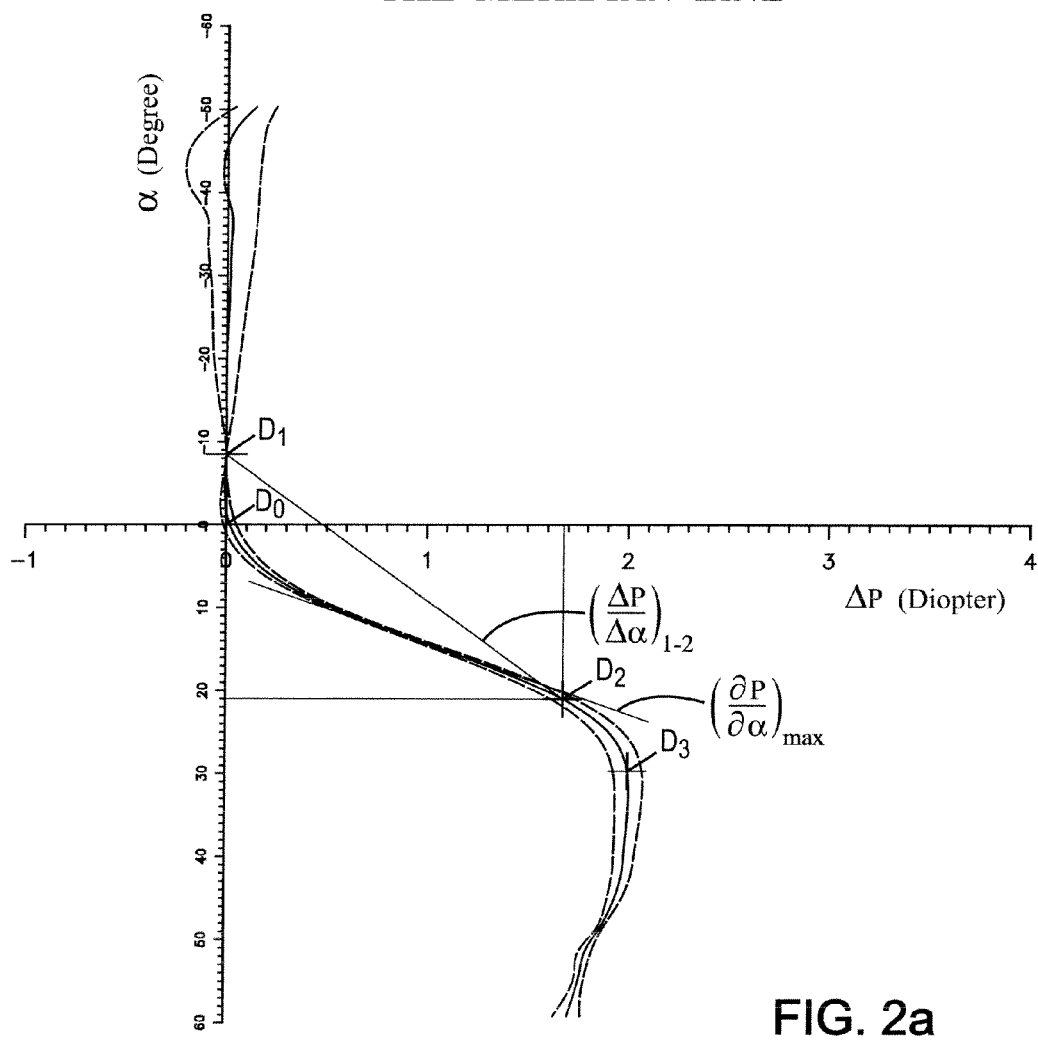
FIG. 2a is a diagram reporting optical power variations for a first eyeglass according to the invention.
Figure 2B:
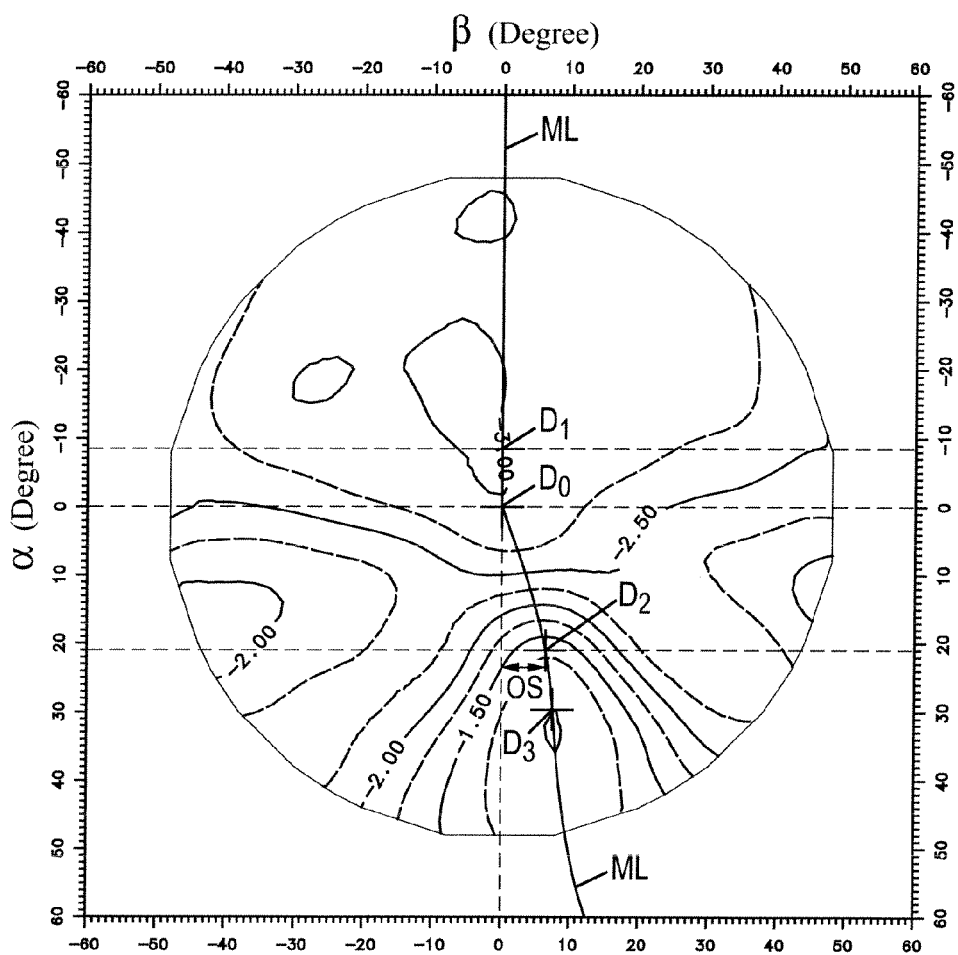
Figure 2C:
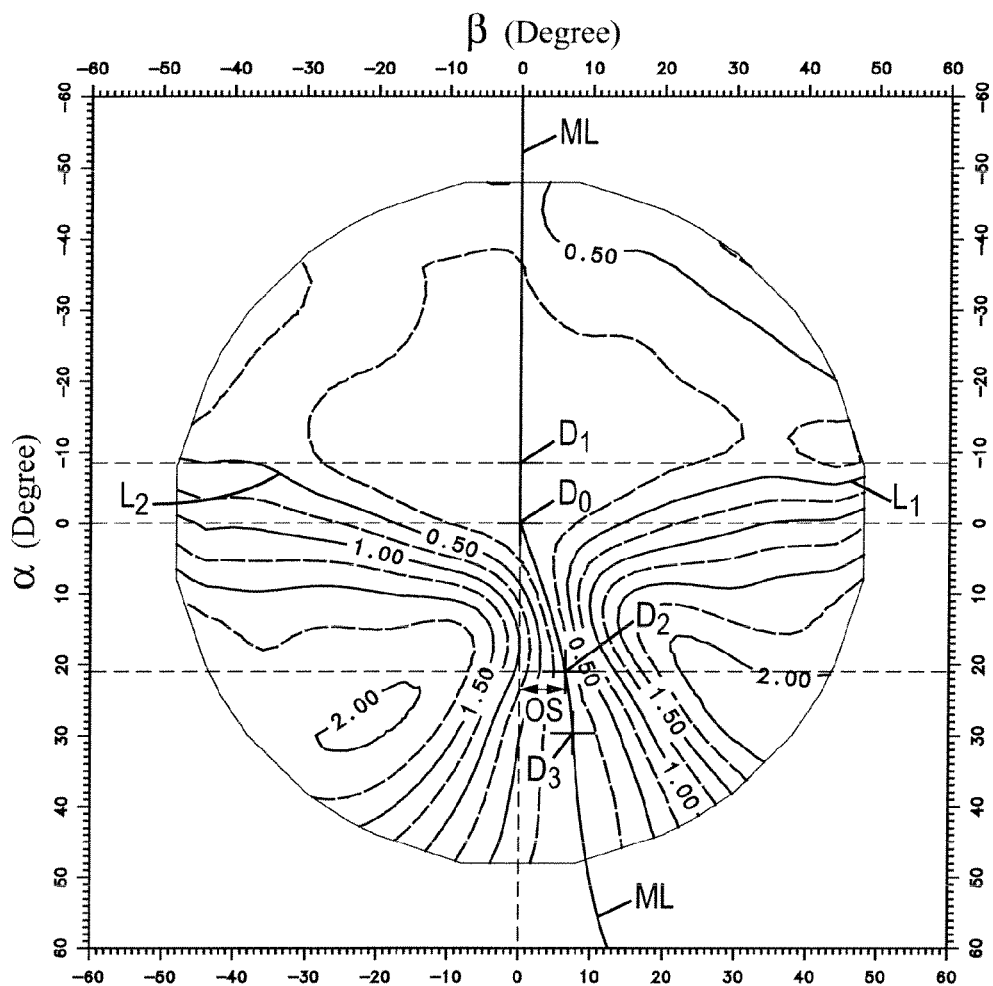
Figure 3A:
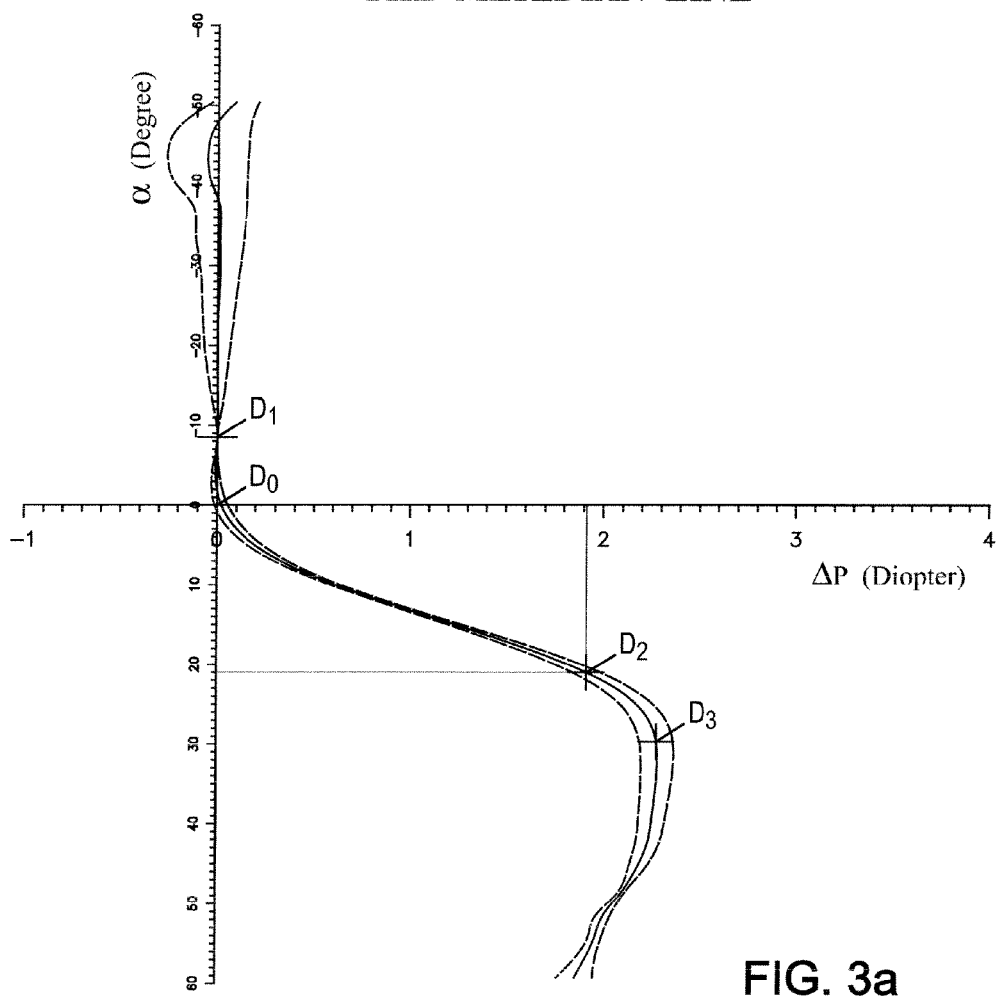
FIGS. 3a-3c respectively correspond to FIGS. 2a-2c for a second eyeglass according to the invention.
Figure 3B:
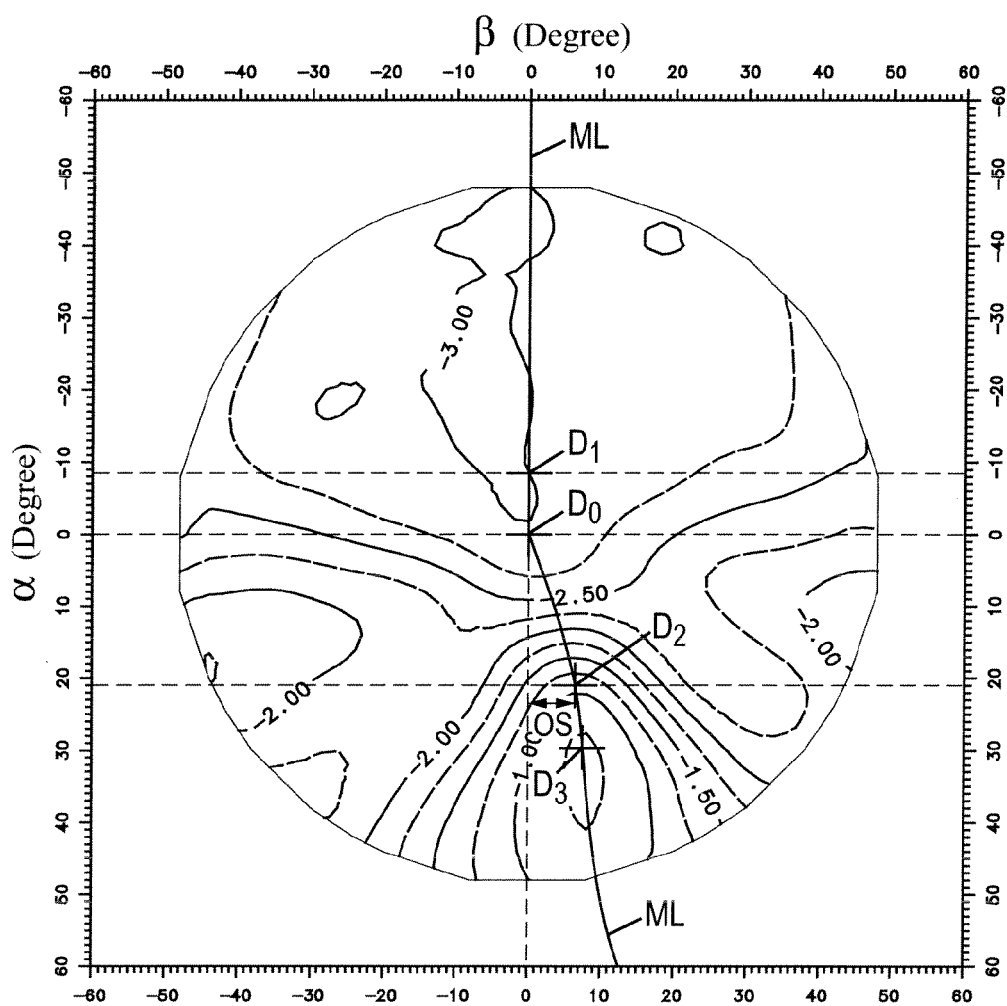
Figure 3C:
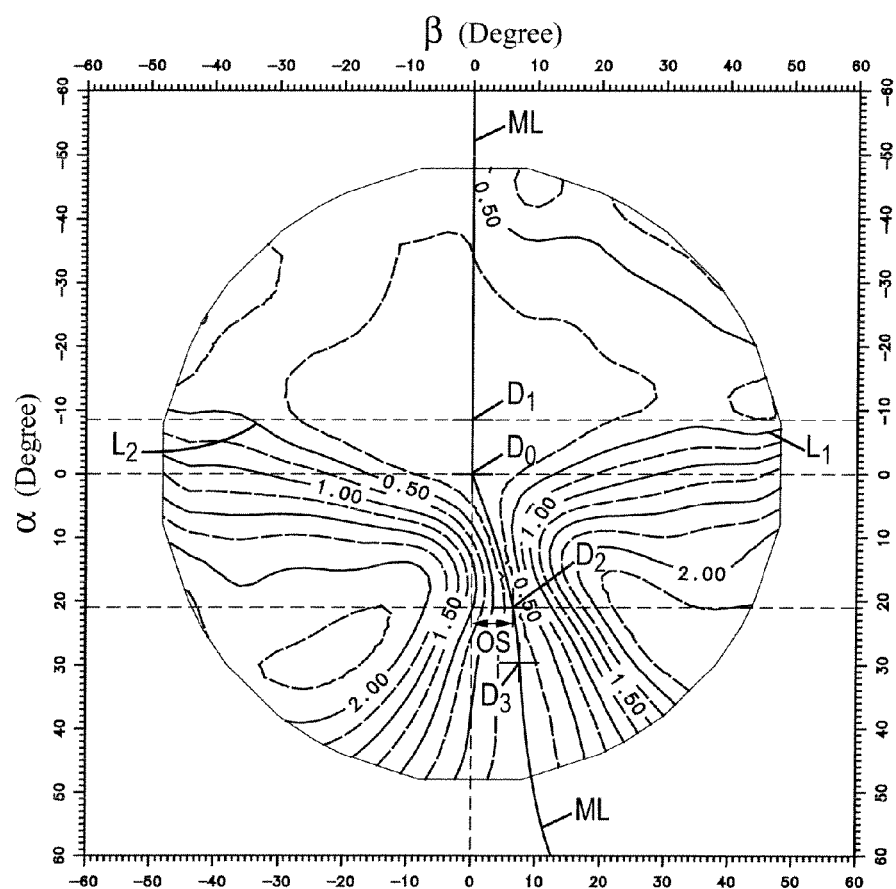
Figure 4A:
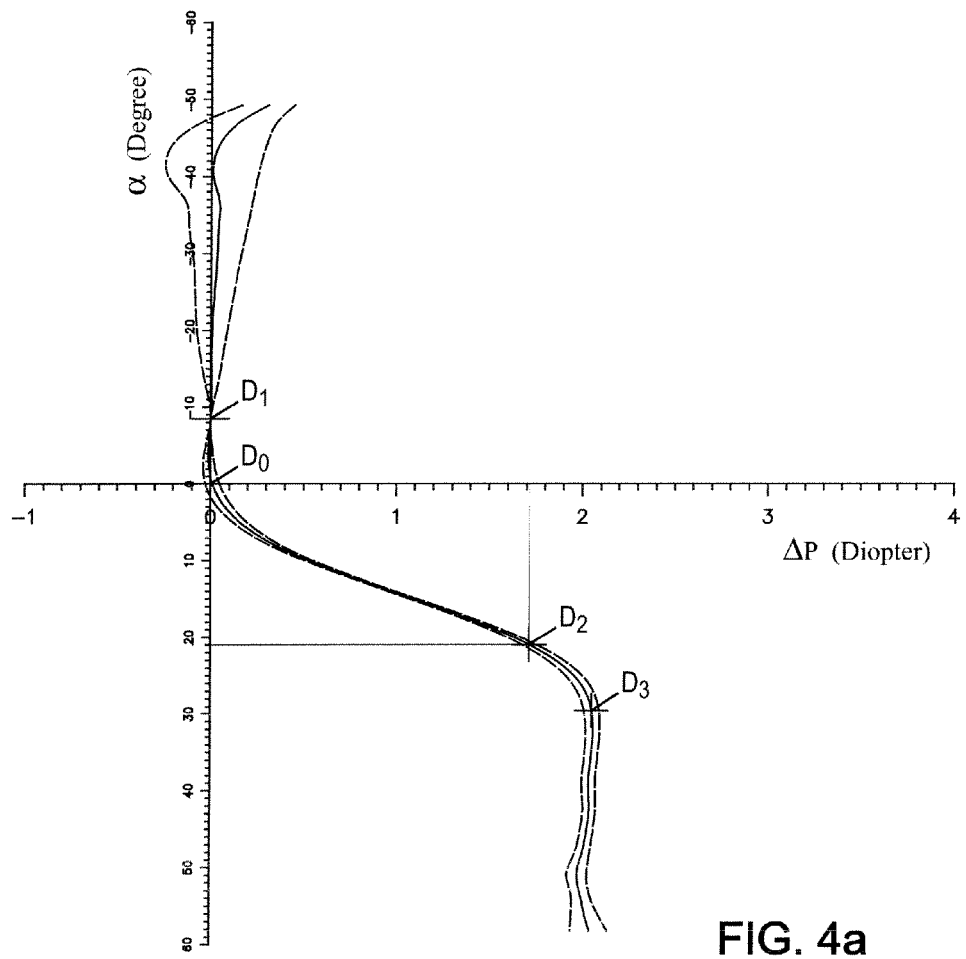
FIGS. 4a-4c respectively correspond to FIGS. 2a-2c for a third eyeglass according to the invention.
Figure 4B:
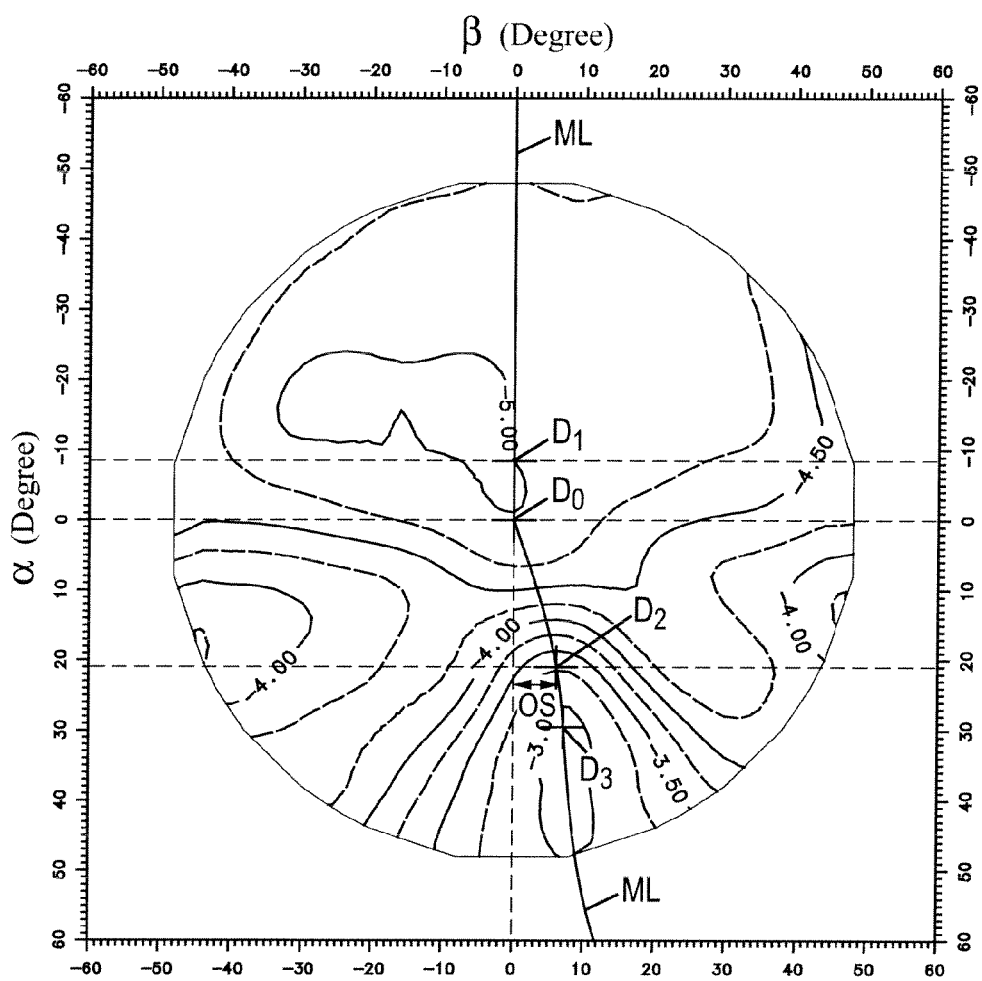
Figure 4C:
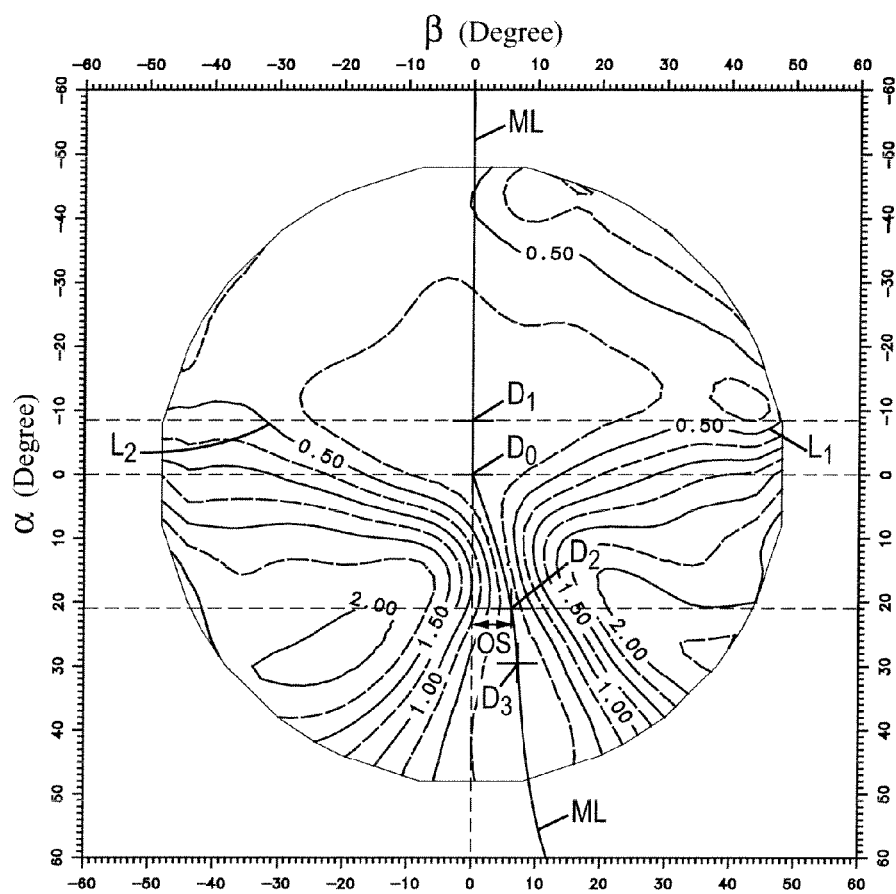
Figure 5A:
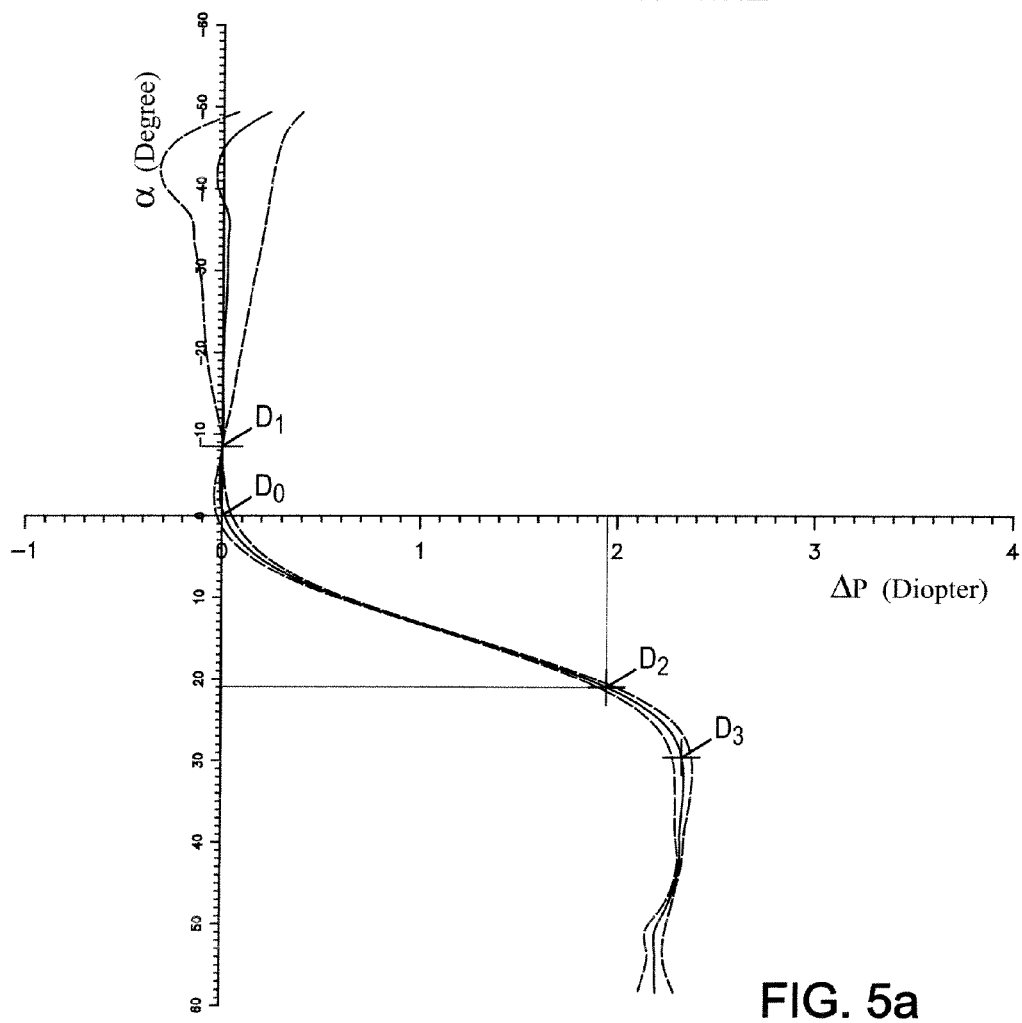
FIGS. 5a-5c respectively correspond to FIGS. 2a-2c for a fourth eyeglass according to the invention.
Figure 5B:
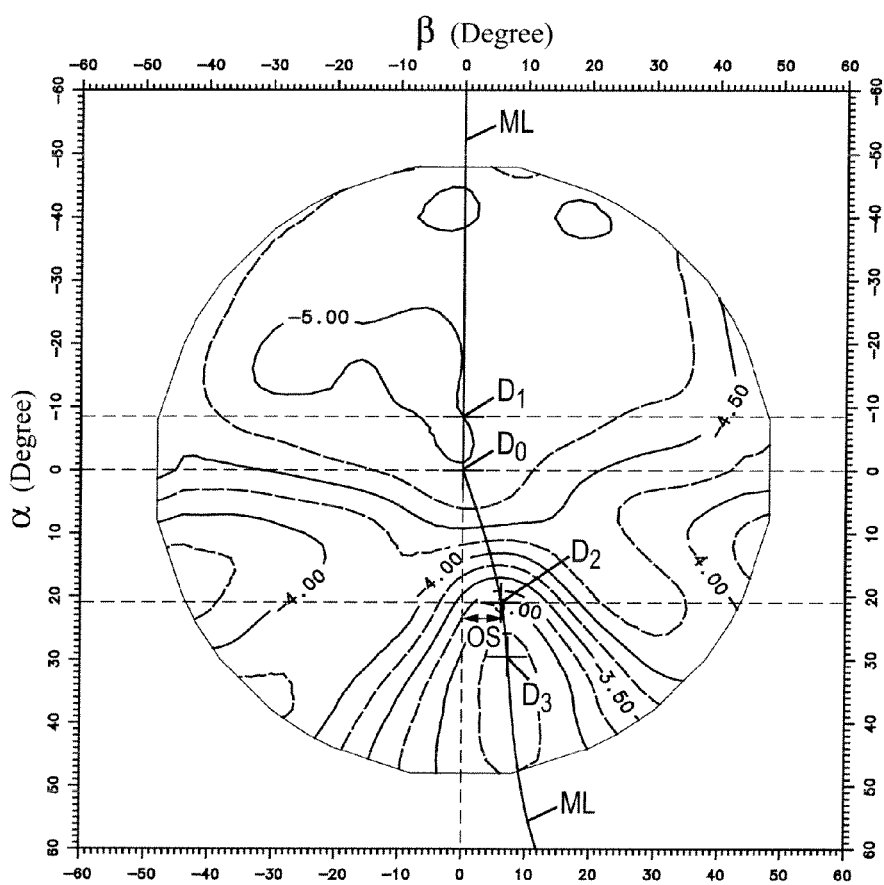
Figure 5C:
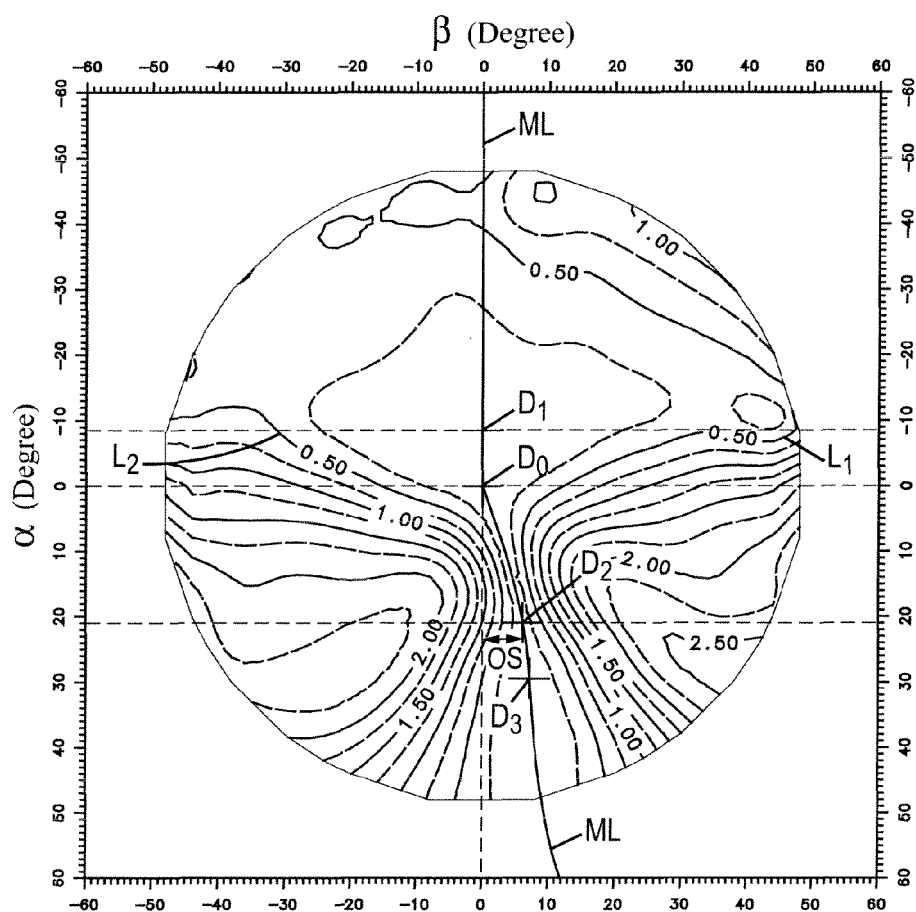

| | Eyeglass number | | | |
|---|---|---|---|---|
| | 1 | 2 | 3 | 4 |
| Optical power for the upper reference eye direction $D_1$ | −3.00 | −3.00 | −5.00 | −5.00 |
| Optical power variation between directions $D_1$ and $D_2$ | 1.68 | 1.92 | 1.71 | 1.93 |
| Optical power variation between directions $D_1$ and $D_3$ | 2.00 | 2.28 | 2.05 | 2.33 |
| Optical power along the meridian line ML | FIG. 2a | FIG. 3a | FIG. 4a | FIG. 5a |
| Optical power map | FIG. 2b | FIG. 3b | FIG. 4b | FIG. 5b |
| Residual astigmatism map | FIG. 2c | FIG. 3c | FIG. 4c | FIG. 5c |

FIGS. 2a, 3a, 4a and 5a are diagrams which show the variations in the optical power along the meridian lines of the eyeglasses. These meridian lines will be defined later in connection with the FIGS. 2c, 3c, 4c and 5c. The horizontal axis of FIGS. 2a, 3a, 4a and 5a indicates the variations ΔP of the optical power with respect to the optical power value produced for the direction $D_1$. The vertical axis indicates the values of the declination angle α as defined earlier, with positive values for eye directions oriented downwards. The continuous curve corresponds to the mean optical power, which is calculated as an average value for planes containing the eye direction and rotated about this direction. The broken curves correspond to the maximum and the minimum optical power value produced in these planes. The primary eye direction $D_0$ together with the reference eye directions Di and $D_2$ are indicated, corresponding respectively to 0°, −8.5° and +21° for α. The eye direction where the variation in the optical power is maximum with respect to direction Di, is $D_3$. It corresponds to the power variations reported in the fourth row of Table 1.

FIGS. 2b, 3b, 4b and 5b are optical power maps for the final eyeglasses. They correspond to the mean optical power of the continuous curves in FIGS. 2a, 3a, 4a and 5a. The vertical and horizontal coordinates of the maps are the values of the declination angle α and the azimuth angle β.

The curves indicated in these maps connect eye directions which correspond to a same optical power value. The respective optical power values for the curves are incremented by 0.25 diopter between neighboring curves, and are indicated on some of these curves.

FIGS. 2c, 3c, 4c and 5c are residual astigmatism maps, with coordinates similar to those of the optical power maps. The curves indicated connect eye directions corresponding to a same astigmatism value. These maps indicate for each eye direction D, the residual astigmatism which is the difference between the astigmatism that is prescribed to the wearer and the astigmatism generated by the lens. Usually, the residual astigmatism is substantially zero for the upper reference eye direction Di. Actually, the astigmatism value for the reference direction Di is selected to meet the prescription data for the user of the eyeglass. It is adjusted most often with the machining of the eyeglass surface other than the complex surface, for example the back surface $S_2$, according to the toric shape. In these residual astigmatism maps, the curves corresponding to 0.5 diopter value define two side limits of a channel devoid of unwanted astigmatism. They are noted Li and $L_2$ respectively. Then, the meridian line ML of each eyeglass is determined by connecting middle points of segments corresponding to constant α values and drawn between the side limits Li and $L_2$. The meridian line contains the eye directions Di, $D_0$ and $D_2$. It also corresponds substantially to the eye directions of minimum residual astigmatism. The meridian line ML corresponds to the vertical plane (X, Z) above the primary eye direction $D_0$. In addition, it is offset positively with respect to the vertical plane (X, Z) below the direction $D_0$. This offset is noted OS at the lower reference eye direction $D_2$, in FIG. 1c and in the maps.

Table 2 below reports further data for the eyeglasses 1 to 4 of Table 1.

TABLE 2

| | Eyeglass number | | | |
|---|---|---|---|---|
| | 1 | 2 | 3 | 4 |
| Optical power variation between directions $D_1$ and $D_0$ | 0.02 | 0.02 | 0.01 | 0.01 |
| Maximum of residual astigmatism between directions $D_1$ and $D_3$ | 0.14 | 0.17 | 0.08 | 0.1 |
| Offset value (OS) | 6.5 | 6.5 | 6 | 6 |
| $\Delta P_{max}[30° \text{ to } 45°]_{ML}$ | 0.06 | 0.1 | 0.04 | 0.04 |
| $\Delta P[D_1; 29°]_{ML}$ | 2.00 | 2.28 | 2.05 | 2.33 |
| Normalized max_gradient$_{ML}$ | 0.069 | 0.068 | 0.068 | 0.069 |
| Far vision zone width at −8.5° | >86° | >83° | 80° | 79° |
| $\Delta\alpha[D_1; D_3]$ | 38° | 38° | 38° | 38° |

In this Table:

$\Delta P_{max}[30° \text{ to } 45°]_{ML}$ is the maximum variation in the optical power along the meridian line ML for values of the declination angle α which are comprised between 30° and 45° below the primary eye direction $D_0$;

$\Delta P[D_1; 29°]_{ML}$ is the variation in the optical power between the upper reference eye direction Di and an eye direction which crosses the meridian line ML with a value of the declination angle α equal to 29° below the primary eye direction $D_0$;

the normalized max_gradient$_{ML}$ is the ratio between the maximum optical power gradient along the meridian line ML and the optical power variation of the eyeglass between the upper reference eye direction Di and the lower reference eye direction $D_2$. In the diagram of FIG. 2a, the maximum optical power gradient is denoted by $(\partial P/\partial \alpha)_{max}$;

the far vision zone width is the angular width between the channel side limits Li and $L_2$ in a plane of constant declination angle which contains the upper reference eye direction $D_1$, i.e. for constant α value equal to –8.5°; and $\Delta\alpha[D_1; D_3]$ is the variation in the declination angle α between the upper reference eye direction Di and the eye direction $D_3$, i.e. the addition length of the eyeglass.

Anyone will understand that the invention is not limited to the eyeglasses of the diagrams and maps appended hereto. Indeed, the exact values of the parameters discussed in the present specification may be varied within appropriate ranges, while at least some of the advantages cited for the invention are retained.

In addition, the invention is not limited to eyeglasses manufactured from blanks provided each with a final progressive addition surface, as considered in the above specification for example purpose only. Identical optical features may be obtained for eyeglasses manufactured with varying manners, possibly resulting in different eyeglass configurations. Indeed, an eyeglass according to the invention may have two progressive addition surfaces. It may be machined directly to its final shape, by performing a machining of both its optical faces. Alternatively, the eyeglass according to the invention may be obtained from a blank with a final spherical or toric surface on one face, by machining the other face with a progressive addition shape. Finally, when the eyeglass has only one progressive addition surface, this latter may be located on the convex front face or the concave back face of the eyeglass.

The invention claimed is:

1. A spectacle eyeglass for a myopic child, comprising:
    a lens of progressive addition type so as to produce variations in optical power and astigmatism values when an eye direction is varying through the lens for a user of said lens,
    said lens having a fitting cross configured to be located in front of an apex of the user's eye when the lens is fitted into a spectacle frame and worn by the user, for the user looking ahead horizontally with his head in vertical position,
    said lens having a channel having two side limits defined by eye directions with 0.5 diopter residual astigmatism, and a meridian line of said lens being equally distant from said channel limits in planes corresponding to a constant declination angle,
    a lower part of said meridian line being offset laterally with respect to a vertical plane when the lens is rotated so that upper extensions of the channel side limits extend symmetrically in lateral angular height with respect to said vertical plane, respectively towards left and right sides of the lens,
    the lens having an optical power increasing along the meridian line, downwards below an upper reference eye direction oriented above a primary eye direction within the vertical plane, said primary eye direction passing through the fitting cross, and said upper reference eye direction corresponding to a point in the lens where the optical power for the far vision is to be measured,
    wherein the following conditions are met:
    /i/ the variation in the optical power between the upper reference eye direction and a lower reference eye direction crossing the meridian line with a declination angle value of 21° below the primary eye direction is comprised between 1.25 and 2.75 diopters, including these limit values;
    /ii/ the variation in the optical power between the upper reference eye direction and the primary eye direction is less than 0.2 diopter;
    /iii/ an offset of the meridian line is higher than 5.5°, said offset being an angular distance between the vertical plane and the lower reference eye direction, measured in a plane of constant declination angle containing said lower reference eye direction.

2. A spectacle eyeglass according to claim 1, wherein the variation in the optical power between the upper reference eye direction and the lower reference eye direction is comprised between 1.75 and 2.25 diopters, including these limit values.

3. A spectacle eyeglass according to claim 1, wherein the variation in the optical power between the upper reference eye direction and the primary eye direction is less than 0.1 diopter.

4. A spectacle eyeglass according to claim 1, wherein the offset of the meridian line is higher than 6°.

5. A spectacle eyeglass according to claim 1, wherein the maximum of residual astigmatism along the meridian line between the upper reference eye direction and an eye direction for which the variation in the optical power with respect to said upper reference eye direction is maximum, is less than 0.3 diopter.

6. A spectacle eyeglass according to claim 1, wherein the variation in the optical power between the upper reference eye direction and an eye direction crossing the meridian line with a declination angle value of 29° below the primary eye direction is comprised between 2.2 and 2.4 diopters.

7. A spectacle eyeglass according to claim 1, wherein a maximum variation in the optical power along the meridian line between two eye directions with respective declination angle values comprised between 30° and 45° below the primary eye direction is less than 0.2 diopter.

8. A spectacle eyeglass according to claim 7, wherein the maximum variation in the optical power along the meridian line between two eye directions with respective declination angle values comprised between 30° and 45° below the primary eye direction is comprised between 0.15+/−0.05 diopter.

9. A spectacle eyeglass according to claim 1, wherein a maximum variation in the optical power along the meridian line with respect to the upper reference eye direction, within an eye direction range of 40° from the primary gaze direction, is comprised between 1.5 and 3.0 diopters.

10. A spectacle eyeglass according to claim 1, wherein a ratio between a maximum optical power gradient along the meridian line and a reference slope is comprised between 0.05 and 0.09, said reference slope being calculated for the optical power variation of the eyeglass between the upper reference eye direction and the lower reference eye direction.

11. A spectacle eyeglass according to claim 10, wherein the ratio between the maximum optical power gradient along the meridian line and the reference slope is comprised between 0.06 and 0.08.

12. A spectacle eyeglass according to claim 1, wherein an angular width between the channel side limits is higher than 50° in a plane of constant declination angle with 8.5° tilt above the primary eye direction.

13. A spectacle eyeglass according to claim 1, wherein the lens includes at least one complex surface.

14. A process for manufacturing a spectacle eyeglass according to claim 1 and for a myopic child, said process comprising the following steps:
- obtaining a myopia prescription for the child;
- selecting a progressive addition blank suitable for obtaining the lens; and
- modifying the progressive addition blank so as to obtain the lens with optical values corresponding to the myopia prescription for at least one eye direction through said lens.

15. A process according to claim 14, wherein the modifying includes modifying the progressive addition blank in a manner that produces the optical values of the lens corresponding to the myopia prescription for the upper reference eye direction.

16. A process according to claim 14, wherein the modifying comprises machining the progressive addition blank.

* * * * *